US011867910B2

United States Patent
Ha et al.

(10) Patent No.: US 11,867,910 B2
(45) Date of Patent: Jan. 9, 2024

(54) WEARABLE ELECTRONIC DEVICE INCLUDING SENSOR MODULE

(71) Applicant: Samsung Electronics Co., Ltd., Suwon-si (KR)

(72) Inventors: Heonjun Ha, Suwon-si (KR); Chulkwi Kim, Suwon-si (KR); Hyoungil Song, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/903,354

(22) Filed: Sep. 6, 2022

(65) Prior Publication Data

US 2023/0124592 A1    Apr. 20, 2023

Related U.S. Application Data

(63) Continuation of application No. PCT/KR2022/009863, filed on Jul. 7, 2022.

(30) Foreign Application Priority Data

Oct. 14, 2021    (KR) .......................... 10-2021-0136888

(51) Int. Cl.
    *G02B 27/01*    (2006.01)
    *G02B 27/00*    (2006.01)
    *G09G 5/00*     (2006.01)

(52) U.S. Cl.
    CPC ..... *G02B 27/0172* (2013.01); *G02B 27/0093* (2013.01); *G02B 27/0101* (2013.01);
    (Continued)

(58) Field of Classification Search
    CPC ............ G02B 27/0172; G02B 27/0101; G02B 27/0093; G02B 2027/0187;
    (Continued)

(56) References Cited

U.S. PATENT DOCUMENTS 10,121,419 B2 * 11/2018 Zhang ................. G02B 27/017
10,613,333 B2 *  4/2020 Yajima .................... G06F 3/012
(Continued)

FOREIGN PATENT DOCUMENTS

CN    113341571    9/2021
KR    10-1385681    4/2014
(Continued)

OTHER PUBLICATIONS

Search Report and Written Opinion dated Oct. 14, 2022 issued in International Patent Application No. PCT/KR2022/009863.

*Primary Examiner* — Doon Y Chow
(74) *Attorney, Agent, or Firm* — Nixon & Vanderhye, P.C.

(57) ABSTRACT

According to an embodiment of the disclosure, an electronic device may comprise: a housing, a light output module comprising light output circuitry disposed in the housing and configured to output an image, a display member comprising a display including a first display member including a first color-changeable lens and a first waveguide disposed behind the first color-changeable lens configured to guide light generated from the light output module and a second display member including a second color-changeable lens and a second waveguide disposed behind the second color-changeable lens configured to guide the light generated from the light output module, a sensor module comprising at least one sensor including a first sensor module including a first sensor configured to detect a first illuminance of light passed through the first display member, a second sensor module including a second sensor configured to detect a second illuminance of light passed through the second display member, and a third sensor module including a third sensor configured to detect a third illuminance of light transferred to the display member, and a processor configured to adjust a first transmittance of the first color-changeable lens and a
(Continued)

second transmittance of the second color-changeable lens based on the first illuminance, the second illuminance, or the third illuminance. The processor may be configured to, based on the first illuminance differing from the second illuminance, provide a voltage to at least one of the first color-changeable lens or the second color-changeable lens so that the first transmittance and the second transmittance are substantially equal to each other.

20 Claims, 10 Drawing Sheets

(52) U.S. Cl.
CPC ...... *G09G 5/003* (2013.01); *G02B 2027/0118* (2013.01); *G02B 2027/0138* (2013.01); *G02B 2027/0178* (2013.01); *G02B 2027/0187* (2013.01); *G09G 2360/144* (2013.01)

(58) Field of Classification Search
CPC .............. G02B 27/0176; G02B 13/004; G02B 2027/0118; G02B 2027/0138; G02B 2027/0178; G09G 5/003; G09G 5/10; G09G 2320/043; G09G 2320/0693; G09G 2360/144; G09G 2360/141
See application file for complete search history.

(56) References Cited

U.S. PATENT DOCUMENTS

| | | | |
|---|---|---|---|
| 11,295,641 B2 * | 4/2022 | Lee | ........................ G03B 21/14 |
| 2012/0069436 A1 | 3/2012 | Ko et al. | |
| 2012/0229458 A1 | 9/2012 | Cheng et al. | |
| 2013/0147859 A1 | 6/2013 | Kobayashi et al. | |
| 2013/0242262 A1 | 9/2013 | Lewis | |
| 2014/0125785 A1 | 5/2014 | Na et al. | |
| 2015/0022542 A1 | 1/2015 | Baba | |
| 2016/0055822 A1 | 2/2016 | Bell | |
| 2017/0345391 A1 | 11/2017 | Usui et al. | |
| 2018/0259776 A1 | 9/2018 | Alton et al. | |
| 2020/0082790 A1 | 3/2020 | Moore et al. | |

FOREIGN PATENT DOCUMENTS

| | | |
|---|---|---|
| KR | 10-2017-0044706 | 4/2017 |
| KR | 10-2020-0095985 | 8/2020 |
| WO | 2015/200151 | 12/2015 |

\* cited by examiner ized, or aging of the color-changeable lens, the transmittance of the color-changeable lens may be varied. When the transmittance of each color-changeable lens is different, user convenience may be reduced. Further, when the transmittance of the color-changeable lens does not reach a designated transmittance, an accident may occur during the user's outdoor activity.

WEARABLE ELECTRONIC DEVICE INCLUDING SENSOR MODULE

CROSS-REFERENCE TO RELATED APPLICATIONS

This application is a continuation of International Application No. PCT/KR2022/009863 designating the United States, filed on Jul. 7, 2022, in the Korean Intellectual Property Receiving Office and claiming priority to Korean Patent Application No. 10-2021-0136888, filed on Oct. 14, 2021, in the Korean Intellectual Property Office, the disclosures of which are incorporated by reference herein in their entireties.

BACKGROUND

Technical Field

The disclosure relates to a wearable electronic device including a sensor module.

Background Art

With the development of electronics and communication technologies, electronic devices may come in a more compact and lightweight form factor to be worn on the user's body without discomfort. For example, commercially available wearable electronic devices include head-mounted devices (HMDs), smart watches (or bands), contact lens-type devices, ring-type devices, glove-type devices, shoe-type devices, or clothing-type devices. Since the wearable electronic device is directly worn on the user's body, more portability and user accessibility may be obtained.

The head mounting device is a device used while being worn on the user's head or face and may provide augmented reality (AR) to the user. For example, a glasses-type head mounting device providing augmented reality may provide information regarding objects in the form of images or texts to the user in at least a partial space of the user's field of view. The head mounting device may provide virtual reality (VR) to the user. For example, the head mounting device may output independent images to the users' eyes and output the content, provided from an external input to the user, in the form of an image or audio, thereby providing a superb sense of immersion.

The wearable electronic device may include an active dimming-type color-changeable lens to enhance user interface visibility. Depending on the characteristics, deviation, or aging of the color-changeable lens, the transmittance of the color-changeable lens may be varied. When the transmittance of each color-changeable lens is different, user convenience may be reduced. Further, when the transmittance of the color-changeable lens does not reach a designated transmittance, an accident may occur during the user's outdoor activity.

SUMMARY

An embodiment of the disclosure provide an electronic device capable of adjusting the transmission of a color-changeable lens to a designated transmittance.

An embodiment of the disclosure provide an electronic device capable of adjusting the transmittance of the left color-changeable lens and the transmittance of the right color-changeable lens to be substantially equal to each other.

The disclosure is not limited to the foregoing embodiments but various modifications or changes may rather be made thereto without departing from the spirit and scope of the disclosure.

According to various example embodiments of the disclosure, an electronic device may comprise: a housing, a light output module including light output circuitry disposed in the housing and configured to output an image, a display member comprising a display including a first display member including a first color-changeable lens and a first waveguide disposed behind the first color-changeable lens configured to guide light generated from the light output module and a second display member including a second color-changeable lens and a second waveguide disposed behind the second color-changeable lens configured to guide the light generated from the light output module, a sensor module including at least one sensor including a first sensor module including a first sensor configured to detect a first illuminance of light passed through the first display member, a second sensor module including a second sensor configured to detect a second illuminance of light passed through the second display member, and a third sensor module including a third sensor configured to detect a third illuminance of light transferred to the display member, and a processor configured to: adjust a first transmittance of the first color-changeable lens and a second transmittance of the second color-changeable lens based on the first illuminance, the second illuminance, or the third illuminance. The processor may be configured to, based on the first illuminance differing from the second illuminance, provide a voltage to at least one of the first color-changeable lens or the second color-changeable lens so that the first transmittance and the second transmittance are substantially equal to each other.

According to various example embodiments of the disclosure, an electronic device may comprise: a housing, a light output module comprising light output circuitry disposed in the housing and configured to output an image, a first display member including a first color-changeable lens and a first waveguide disposed behind the first color-changeable lens configured to guide light generated from the light output module, a second display member including a second color-changeable lens and a second waveguide disposed behind the second color-changeable lens configured to guide light generated from the light output module, a first sensor module including a first sensor configured to detect a first illuminance of light passed through the first display member, a second sensor module including a second sensor configured to detect a second illuminance of light passed through the second display member, and a processor configured to: adjust at least one of a first transmittance of the first color-changeable lens or a second transmittance of the second color-changeable lens based on a difference between the first illuminance and the second illuminance.

According to various example embodiments of the disclosure, an electronic device may include a sensor module that detects the illuminance of the light transferred to a display member and the illuminance of the light passed through the display member. The electronic device may change the transmittance of the left display member and the transmittance of the right display member to be substantially the same based on the illuminance of the light detected by the sensor module and change the transmittance of the color-changeable lens to a designated transmittance, thereby increasing user convenience.

DESCRIPTION OF THE DRAWINGS

The above and other aspects, features and advantages of certain embodiments of the present disclosure will be more apparent from the following detailed description, taken in conjunction with the accompanying drawings, in which.

MODE FOR INVENTION

Figure 1:
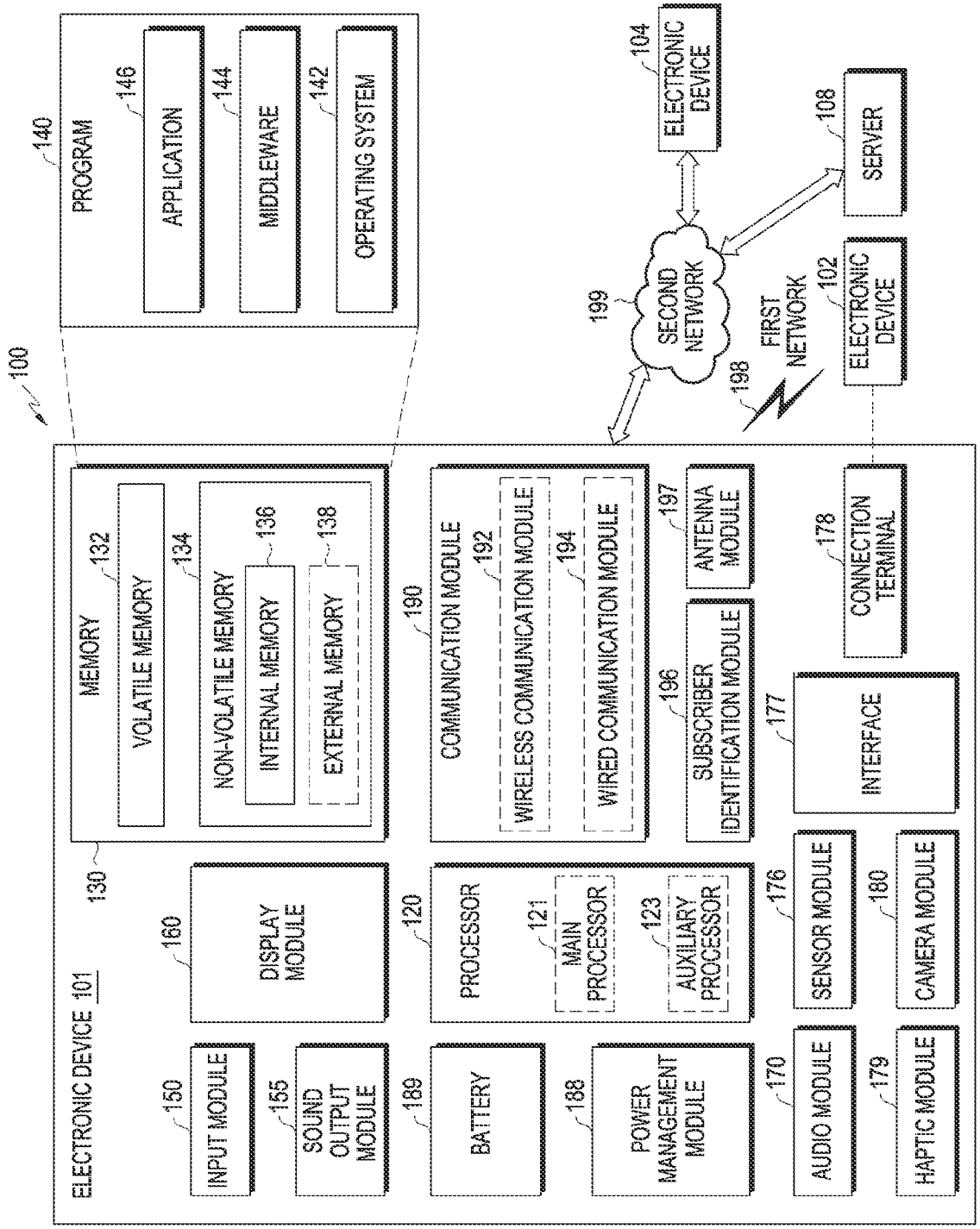
FIG. 1 is a block diagram illustrating an example electronic device in a network environment according to an embodiment.

FIG. 1 is a block diagram illustrating an electronic device in a network environment according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to an embodiment of the disclosure may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that an embodiment of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to an embodiment, each component (e.g., a module or a program) of the above-described components may include a single entity or multiple entities. Some of the plurality of entities may be separately disposed in different components. According to an embodiment, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 2:
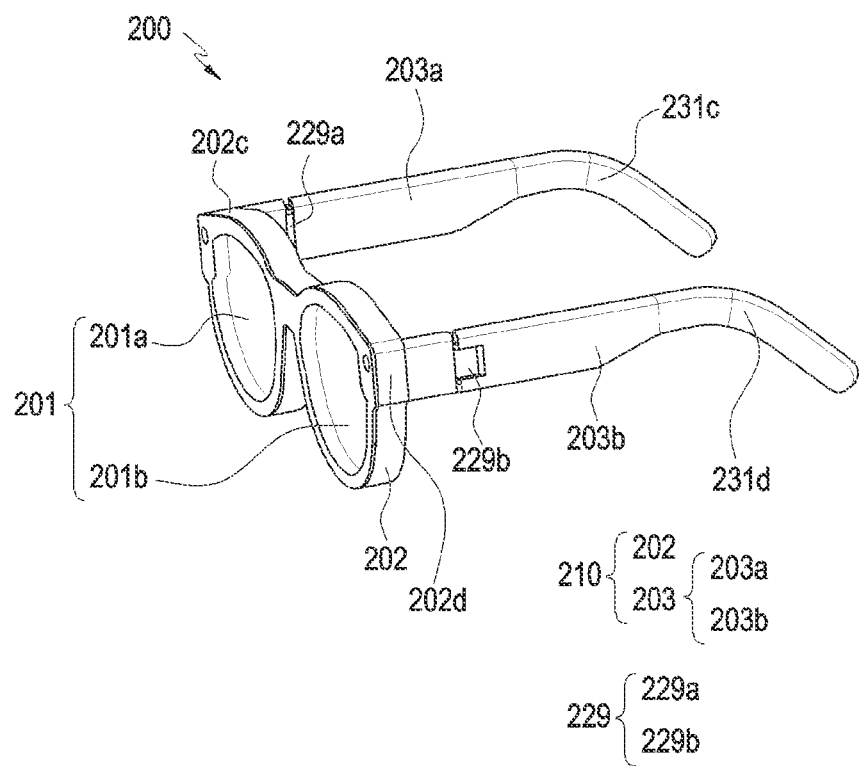
FIG. 2 is a perspective view illustrating an electronic device according to an embodiment.

FIG. 2 is a perspective view illustrating an electronic device according to an embodiment.

Referring to FIG. 2, the electronic device 200 may be a glasses-type wearable electronic device, and the user may visually recognize her surrounding objects or environment while wearing the electronic device 200. For example, the electronic device 200 may be a head-mounted device (HMD) or smart glasses capable of providing images directly in front of the user's eyes. The configuration of the electronic device 200 of FIG. 2 may be identical in whole or part to the configuration of the electronic device 101 of FIG. 1.

According to an embodiment, the electronic device 200 may include a housing that forms the exterior of the electronic device 200. The housing 210 may provide a space in which components of the electronic device 200 may be disposed. For example, the housing 210 may include a lens frame 202 and at least one wearing member 203.

According to an embodiment, the electronic device 200 may include at least one display member 201 capable of providing the user with visual information. For example, the display member 201 may include a module equipped with a lens, a display, a waveguide, and/or a touch circuit. According to an embodiment, the display member 201 may be transparent or translucent. According to an embodiment, the display member 201 may include a semi-transparent glass or a window member the light transmittance of which may be adjusted as the coloring concentration is adjusted. According to an embodiment, a pair of display members 201 may be provided and disposed to correspond to the user's left and right eyes, respectively, with the electronic device 200 worn on the user's body. For example, the display member 201 may include a first display member 201a and a second display member 201b disposed to be spaced apart from the first display member 201. The first display member 201a may be disposed to correspond to the user's right eye, and the second display member 201b may be disposed to correspond to the user's left eye.

According to an embodiment, the lens frame 202 may receive at least a portion of the display member 201. For example, the lens frame 202 may surround at least a portion of the display member 201. According to an embodiment, the lens frame 202 may position at least one of the display members 201 to correspond to the user's eye. According to an embodiment, the lens frame 202 may be the rim of a normal eyeglass structure. According to an embodiment, the lens frame 202 may include at least one closed loop surrounding the display devices 201. According to an embodiment, the lens frame 202 may include a first end 202c and a second end 202d opposite to the first end 202c. The first end 202c may be disposed adjacent to the first wearing member 203a, and the second end 202d may be disposed adjacent to the second wearing member 203b.

According to an embodiment, the wearing members 203 may extend from the lens frame 202. For example, the wearing members 203 may extend from ends of the lens frame 202 and, together with the lens frame 202, may be supported and/or positioned on a part (e.g., ears) of the user's body. According to an embodiment, the wearing members 203 may be rotatably coupled to the lens frame 202 through hinge structures 229. According to an embodiment, the wearing member 203 may include an inner side surface 231c configured to face the user's body and an outer side surface 231d opposite to the inner side surface. According to an embodiment (not shown), at least a portion of the wearing member 203 may be formed of a flexible material (e.g., rubber). For example, at least a portion of the wearing member 203 may be formed in a band shape surrounding at least a portion of the user's body (e.g., ears).

According to an embodiment, the wearing member 203 may include a first wearing member 203a and a second wearing member 203b. According to an embodiment, the first wearing member 203a may be connected to the first end 202c of the lens frame 202, and the second wearing member 203b may be connected to the second end 202d of the lens frame 202.

According to an embodiment, the electronic device 200 may include the hinge structures 229 configured to fold the wearing members 203 on the lens frame 202. The hinge structure 229 may be disposed between the lens frame 202 and the wearing member 203. While the electronic device 200 is not worn, the user may fold the wearing members 203 on the lens frame 202 to carry or store the electronic device. According to an embodiment, the hinge structure 229 may include a first hinge structure 229a connected to a portion (e.g., the first end 202c) of the lens frame 202 and the first wearing member 203a and a second hinge structure 229b connected to a portion (e.g., the second end 202d) of the lens frame 202 and the second wearing member 203b.

Figure 3:
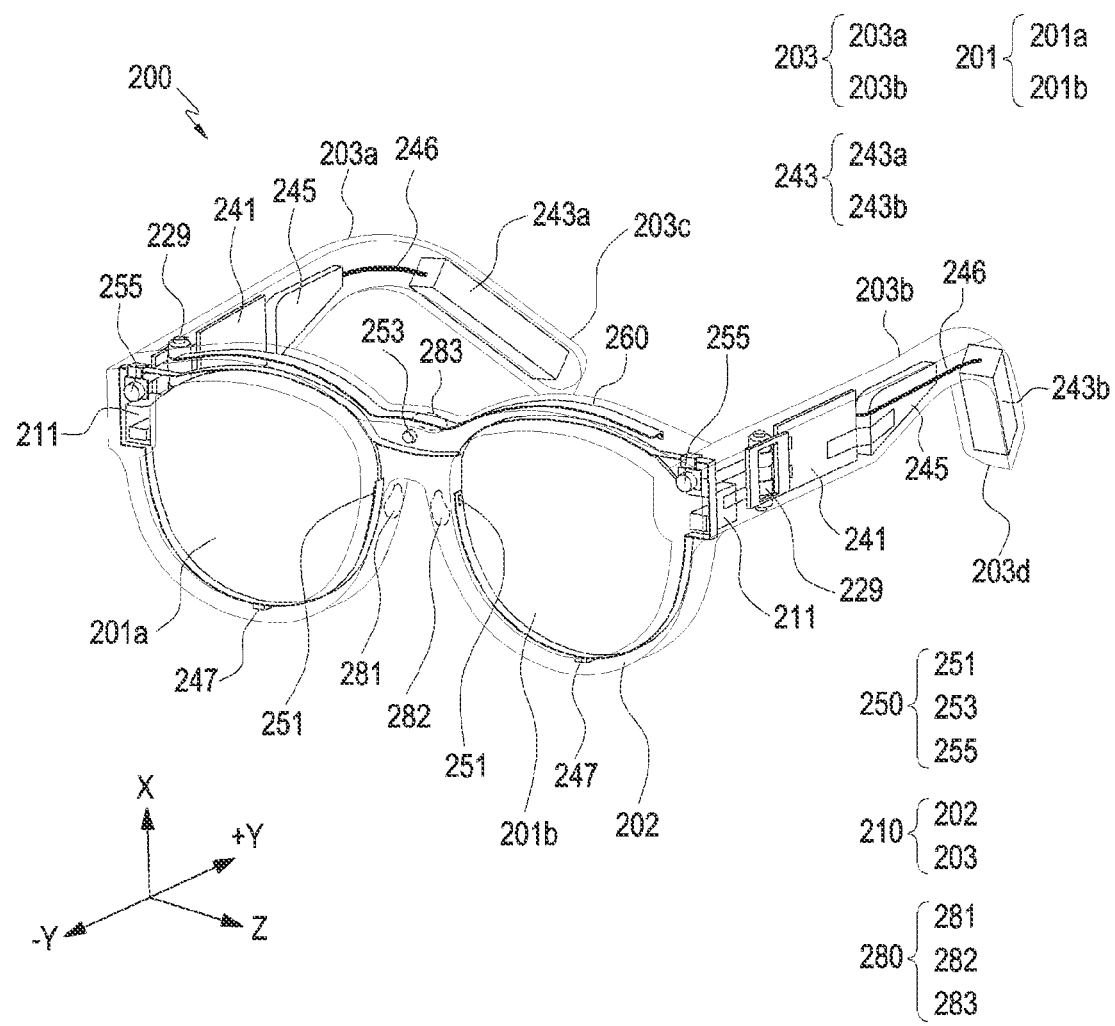
FIG. 3 is a perspective view illustrating an internal configuration of an electronic device according to an embodiment.
Figure 4:
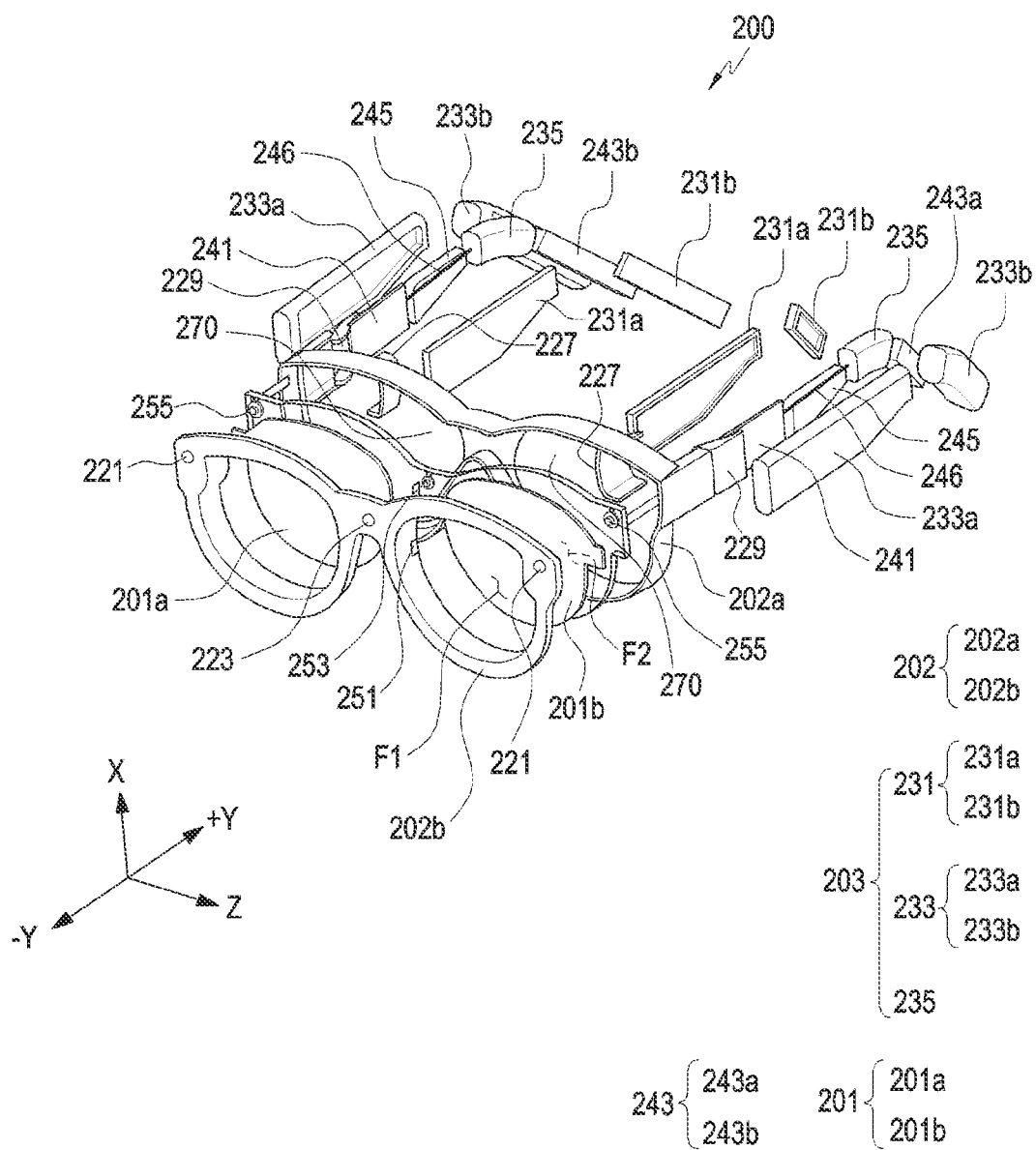
FIG. 4 is an exploded perspective view illustrating an electronic device according to an embodiment.

FIG. 3 is a perspective view illustrating an internal configuration of an electronic device according to an embodiment. FIG. 4 is an exploded perspective view illustrating an electronic device according to an embodiment.

Referring to FIGS. 3 and 4, the electronic device 200 may include a display member 201, a lens frame 202, a wearing member 203, a hinge structure 229, at least one circuit board 241, at least one battery 243, at least one power transfer structure 246, a camera module 250, and a sensor module 280. The configuration of the display member 201, the lens frame 202, the wearing member 203, and the hinge structure 229 of FIG. 3 and/or 4 may be identical in whole or part to the configuration of the display member 201, the lens frame 202, the wearing member 203, and the hinge structure 229 of FIG. 2.

According to an embodiment, the electronic device 200 may obtain and/or recognize a visual image regarding an object or environment in the direction (e.g., −Y direction) in which the electronic device 200 faces or the direction in which the user gazes, using the camera module 250 (e.g., the camera module 180 of FIG. 1) and may receive information regarding the object or environment from an external electronic device (e.g., the electronic device 102 or 104 or the server 108 of FIG. 1) through a network (e.g., the first network 198 or second network 199 of FIG. 1). In an embodiment, the electronic device 200 may provide the received object- or environment-related information, in the form of an audio or visual form, to the user. The electronic device 200 may provide the received object- or environment-related information, in a visual form, to the user through the display members 201, using the display module (e.g., the display module 160 of FIG. 1). For example, the electronic device 200 may implement augmented reality (AR) by implementing the object- or environment-related information in a visual form and combining it with an actual image of the user's surrounding environment.

According to an embodiment, the display member 201 may include a first surface F1 facing in a direction (e.g., −y direction) in which external light is incident and a second surface F2 facing in a direction (e.g., +y direction) opposite to the first surface F1. With the user wearing the electronic device 200, at least a portion of the light or image coming through the first surface F1 may be incident on the user's left eye and/or right eye through the second surface F2 of the display member 201 disposed to face the user's left eye and/or right eye.

According to an embodiment, the lens frame 202 may include at least two or more frames. For example, the lens frame 202 may include a first frame 202a and a second frame 202b. According to an embodiment, when the user wears the electronic device 200, the first frame 202a may be a frame of the portion facing the user's face, and the second frame 202b may be a portion of the lens frame 202 spaced from the first frame 202a in the gazing direction (e.g., −Y direction) in which the user gazes.

According to an embodiment, the electronic device 200 may include a light output module 211 configured to provide an image and/or video to the user. For example, the light output module 211 may include a display panel (not shown) capable of outputting images and a lens (not shown) corresponding to the user's eye and guiding images to the display member 201. For example, the user may obtain the image output from the display panel of the light output module 211 through the lens of the light output module 211. According to an embodiment, the light output module 211 may include a device configured to display various information. For example, the light output module 211 may include at least one of a liquid crystal display (LCD), a digital mirror device (DMD), a liquid crystal on silicon (LCoS), or an organic light emitting diode (OLED), or a micro light emitting diode (micro LED). According to an embodiment, when the light output module 211 and/or the display member 201 includes one of a liquid crystal display device, a digital mirror display device, or a silicon liquid crystal display device, the electronic device 200 may include a light output module 211 and/or a light source emitting light to the display area of the display member 201. According to an embodiment, when the light output module 211 and/or the display member 201 includes organic light emitting diodes or micro LEDs, the electronic device 200 may provide virtual images to the user without a separate light source.

According to an embodiment, at least a portion of the light output module 211 may be disposed in the housing 210. For example, the light output module 211 may be disposed in the wearing member 203 or the lens frame 202 to correspond to each of the user's right eye and left eye. According to an embodiment, the light output module 211 may be connected to the display member 201 and may provide images to the user through the display member 201. For example, the image output from the light output module 211 may be incident on the display member 201 through an input optical member positioned at an end of the display member 201 and be radiated to the user's eyes through a waveguide (e.g., the waveguide 320 of FIG. 5) and an output optical member positioned in at least a portion of the display member 201.

According to an embodiment, the electronic device 200 may include a circuit board 241 (e.g., a printed circuit board (PCB), a printed board assembly (PBA), a flexible PCB (FPCB), or a rigid-flexible PCB (RFPCB)) receiving components for driving the electronic device 200. For example, the circuit board 241 may include at least one integrated circuit chip. Further, at least one of the processor 120, the memory 130, the power management module 188, or the communication module 190 of FIG. 1 may be provided in the integrated circuit chip. According to an embodiment, a circuit board 241 may be disposed in the wearing member 203 of the housing 210. For example, the circuit board 241 may include a first circuit board 241a disposed in the first wearing member 203a and a second circuit board 241b disposed in the second wearing member 203b. According to an embodiment, the communication module 190 may be positioned in the wearing member 203a or 203b different from that where the processor 120 is positioned. For example, the communication module 190 may be mounted on the first circuit board 241a positioned in the first wearing member 203a, and the processor 120 may be mounted on the second circuit board 241b positioned in the second wearing member 203b. According to an embodiment, the circuit board 241 may be electrically connected to the battery 243 through the power transfer structure 246. According to an embodiment, the circuit board 241 may be an interposer circuit board.

According to an embodiment, the battery 243 (e.g., the battery 189 of FIG. 1) may be connected with components (e.g., the light output module 211, the circuit board 241, and the speaker module 245, the microphone module 247, and/or the camera module 250) of the electronic device 200 and may supply power to the components of the electronic device 200.

According to an embodiment, at least a portion of the battery 243 may be disposed in the wearing member 203. According to an embodiment, the battery 243 may include a first battery 243a disposed in the first wearing member 203a and a second battery 243b disposed in the second wearing member 203b. According to an embodiment, batteries 243 may be disposed adjacent to ends 203c and 203d of the wearing members 203.

According to an embodiment, the speaker module 245 (e.g., the audio module 170 or the sound output module 155 of FIG. 1) may convert an electrical signal into sound. At least a portion of the speaker module 245 may be disposed in the wearing member 203 of the housing 210. According to an embodiment, the speaker module 245 may be located in the wearing member 203 to correspond to the user's ear. According to an embodiment (e.g., FIG. 3), the speaker module 245 may be disposed next to the circuit board 241. For example, the speaker module 245 may be disposed between the circuit board 241 and the battery 243. According to an embodiment (not shown), the speaker module 245 may be disposed on the circuit board 241. For example, the speaker module 245 may be disposed between the circuit board 241 and the inner case (e.g., the inner case 231 of FIG. 4).

According to an embodiment, the electronic device 200 may include a power transfer structure 246 configured to transfer power from the battery 243 to an electronic component (e.g., the light output module 211) of the electronic device 200. For example, the power transfer structure 246 may be electrically connected to the battery 243 and/or the circuit board 241, and the circuit board 241 may transfer the received power to the light output module 211 through the power transfer structure 246. According to an embodiment, the power transfer structure 246 may be a component capable of transferring power. For example, the power transfer structure 246 may include a flexible printed circuit board or wiring. For example, the wiring may include a plurality of cables (not shown). In an embodiment, various changes may be made to the shape of the power transfer structure 246 considering the number and/or type of the cables.

According to an embodiment, the microphone module 247 (e.g., the input module 150 and/or the audio module 170 of FIG. 1) may convert a sound into an electrical signal. According to an embodiment, the microphone module 247 may be disposed in the lens frame 202. For example, at least one microphone module 247 may be disposed on a lower end (e.g., in the −X-axis direction) and/or on an upper end (e.g., in the +X-axis direction) of the electronic device 200. According to an embodiment, the electronic device 200 may more clearly recognize the user's voice using voice information (e.g., sound) obtained by the at least one microphone module 247. For example, the electronic device 200 may distinguish the voice information from the ambient noise based on the obtained voice information and/or additional information (e.g., low-frequency vibration of the user's skin and bones). For example, the electronic device 200 may clearly recognize the user's voice and may perform a function of reducing ambient noise (e.g., noise canceling).

According to an embodiment, the camera module 250 may capture a still image and/or a video. The camera module 250 may include at least one of a lens, at least one image sensor, an image signal processor, or a flash. According to an embodiment, the camera module 250 may be disposed in the lens frame 202 and may be disposed around the display member 201.

According to an embodiment, the camera module 250 may include at least one first camera module 251. According to an embodiment, the first camera module 251 may capture the trajectory of the user's eye (e.g., a pupil) or gaze. For example, the first camera module 251 may include a light emitting unit (e.g., an IR LED) (not shown) configured to emit light in an infrared band and a camera structure (not shown) configured to capture the reflection pattern of the light emitted by the light emitting unit to the user's eyes. According to an embodiment, the processor (e.g., the processor 120 of FIG. 1) may adjust the position of the virtual image so that the virtual image projected on the display member 201 corresponds to the direction in which the user's pupil gazes. According to an embodiment, it is possible to track the trajectory of the user's eyes or gaze using a plurality of first camera modules 251 having the same specifications and performance.

According to an embodiment, the first camera module 251 may periodically or aperiodically transmit information related to the trajectory of the user's eye or gaze (e.g., trajectory information) to the processor (e.g., the processor 120 of FIG. 1). According to an embodiment, when the first camera module 251 detects a change in the user's gaze based on the trajectory information (e.g., when the user's eyes move more than a reference value with the head positioned still), the first camera module 251 may transmit the trajectory information to the processor.

According to an embodiment, the camera modules 250 may include at least one second camera module 253. According to an embodiment, the second camera module 253 may capture an external image. According to an embodiment, the second camera module 253 may capture an external image through the second optical hole 223 formed in the second frame 202b. For example, the second camera module 253 may include a high-resolution color camera, and it may be a high resolution (HR) or photo video (PV) camera. According to an embodiment, the second camera module 253 may provide an auto-focus (AF) function and an optical image stabilizer (OIS) function.

According to an embodiment (not shown), the electronic device 200 may include a flash (not shown) positioned adjacent to the second camera module 253. For example, the flash (not shown) may provide light for increasing brightness (e.g., illuminance) around the electronic device 200 when an external image is obtained by the second camera module 253, thereby reducing difficulty in obtaining an image due to the dark environment, the mixing of various light beams, and/or the reflection of light.

According to an embodiment, the camera modules 250 may include at least one third camera module 255. According to an embodiment, the third camera module 255 may capture the user's motion through a first optical hole 221 formed in the lens frame 202. For example, the third camera module 255 may capture the user's gesture (e.g., hand gesture). Third camera modules 255 and/or first optical holes 221 may be disposed on two opposite sides of the lens frame 202 (e.g., the second frame 202b), e.g., formed in two opposite ends of the lens frame 202 (e.g., the second frame 202b) with respect to the X direction. According to an embodiment, the third camera module 255 may be a global shutter (GS)-type camera. For example, the third camera module 255 may be a camera supporting 3 DoF (degrees of freedom) or 6 DoF, which may provide position recognition and/or motion recognition in a 360-degree space (e.g., omni-directionally). According to an embodiment, the third camera modules 255 may be stereo cameras and may perform the functions of simultaneous localization and mapping (SLAM) and user motion recognition using a plurality of global shutter-type cameras with the same specifications and performance. According to an embodiment, the third camera module 255 may include an infrared (IR) camera (e.g., a time of flight (TOF) camera or a structured light camera). For example, the IR camera may be operated as at least a portion of a sensor module (e.g., the sensor module 176 of FIG. 1) for detecting a distance from the subject.

According to an embodiment, at least one of the first camera module 251 or the third camera module 255 may be replaced with a sensor module (e.g., the sensor module 176 of FIG. 1). For example, the sensor module may include at least one of a vertical cavity surface emitting laser (VCSEL), an infrared sensor, and/or a photodiode. For example, the photodiode may include a positive intrinsic negative (PIN) photodiode or an avalanche photodiode (APD). The photodiode may be interpreted as a photo detector or a photo sensor.

According to an embodiment, at least one of the first camera module 251, the second camera module 253, and the third camera module 255 may include a plurality of camera modules (not shown). For example, the second camera module 253 may include a plurality of lenses (e.g., wide-angle and telephoto lenses) and image sensors and may be disposed on one surface (e.g., a surface facing in the −Y axis) of the electronic device 200. For example, the electronic device 200 may include a plurality of camera modules having different properties (e.g., angle of view) or functions and control to change the angle of view of the camera module based on the user's selection and/or trajectory information. At least one of the plurality of camera modules may be a wide-angle camera and at least another of the plurality of camera modules may form a telephoto camera.

According to an embodiment, the processor (e.g., processor 120 of FIG. 1) may determine the motion of the electronic device 200 and/or the user's motion using information for the electronic device 200 obtained using at least one of a gesture sensor, a gyro sensor, or an acceleration sensor of the sensor module (e.g., the sensor module 176 of FIG. 1) and the user's action (e.g., approach of the user's body to the electronic device 200) obtained using the third camera module 255. According to an embodiment, in addition to the above-described sensor, the electronic device 200 may include a magnetic (geomagnetic) sensor capable of measuring an orientation using a magnetic field and magnetic force lines and/or a hall sensor capable of obtaining motion information (e.g., moving direction or distance) using the strength of a magnetic field. For example, the processor may determine the motion of the electronic device 200 and/or the user's motion based on information obtained from the magnetic (geomagnetic) sensor and/or the hall sensor.

According to an embodiment (not shown), the electronic device 200 may perform an input function (e.g., a touch and/or pressure sensing function) capable of interacting with the user. For example, a component configured to perform a touch and/or pressure sensing function (e.g., a touch sensor and/or a pressure sensor) may be disposed in at least a portion of the wearing member 203. The electronic device 200 may control the virtual image output through the display member 201 based on the information obtained through the components. For example, a sensor associated with a touch and/or pressure sensing function may be configured in various types, e.g., a resistive type, a capacitive type, an electro-magnetic (EM) type, or an optical type. According to an embodiment, the component configured to perform the touch and/or pressure sensing function may be identical in whole or part to the configuration of the input module 150 of FIG. 1.

According to an embodiment, the electronic device 200 may including a reinforcing member 260 that is disposed in an inner space of the lens frame 202 and formed to have a higher rigidity than that of the lens frame 202.

According to an embodiment, the electronic device 200 may include a lens structure 270. The lens structure 270 may refract at least a portion of light. For example, the lens structure 270 may be a prescription lens having a designated refractive power. According to an embodiment, at least a portion of the lens structure 270 may be disposed behind (e.g., +Y direction) of the display member 201. For example, the lens structure 270 may be positioned between the display member 201 and the user's eye.

According to an embodiment, the housing 210 may include a hinge cover 227 that may conceal a portion of the hinge structure 229. Another part of the hinge structure 229 may be received or hidden between an inner case 231 and an outer case 233, which are described below.

According to an embodiment, the wearing member 203 may include the inner case 231 and the outer case 233. The inner case 231 may be, e.g., a case configured to face the user's body or directly contact the user's body, and may be formed of a material having low thermal conductivity, e.g., a synthetic resin. According to an embodiment, the inner case 231 may include an inner side surface (e.g., the inner side surface 231c of FIG. 2) facing the user's body. The outer case 233 may include, e.g., a material (e.g., a metal) capable of at least partially transferring heat and may be coupled to the inner case 231 to face each other. According to an embodiment, the outer case 233 may include an outer side surface (e.g., the outer side surface 231d of FIG. 2) opposite to the inner side surface 331c. In an embodiment, at least one of the circuit board 241 or the speaker module 245 may be received in a space separated from the battery 243 in the wearing member 203. In the illustrated embodiment, the inner case 231 may include a first case 231a including the circuit board 241 and/or the speaker module 245 and a second case 231b receiving the battery 243, and the outer case 233 may include a third case 233a coupled to face the first case 231a and a fourth case 233b coupled to face the second case 231b. For example, the first case 231a and the third case 233a may be coupled (hereinafter, 'first case portions 231a and 233a') to receive the circuit board 241 and/or the speaker module 245, and the second case 231b and the fourth case 233b may be coupled (hereinafter, 'second case portions 231b and 233b') to receive the battery 343.

According to an embodiment, the first case portions 231a and 233a may be rotatably coupled to the lens frame 202 through the hinge structure 229, and the second case portions 231b and 233b may be connected or mounted to the ends of the first case portions 231a and 233a through the connecting structure 235. In some embodiments, a portion of the connecting structure 235 in contact with the user's body may be formed of a material having low thermal conductivity, e.g., an elastic material, such as silicone, polyurethane, or rubber, and another portion thereof which does not come into contact with the user's body may be formed of a material having high thermal conductivity (e.g., a metal). For example, when heat is generated from the circuit board 241 or the battery 243, the connecting structure 235 may block heat transfer to the portion in contact with the user's body while dissipating or discharging heat through the portion not in contact with the user's body. According to an embodiment, a portion of the connecting structure 235 configured to come into contact with the user's body may be interpreted as a portion of the inner case 231, and a portion of the connecting structure 235 that does not come into contact with the user's body may be interpreted as a portion of the outer case 233. According to an embodiment (not shown), the first case 231a and the second case 231b may be integrally configured without the connecting structure 235, and the third case 233a and the fourth case 233b may be integrally configured without the connecting structure 235. According to an embodiment, other components (e.g., the antenna module 197 of FIG. 1) may be further included in addition to the illustrated components, and information regarding an object or environment may be received from an external electronic device (e.g., the electronic device 102 or 104 or server 108 of FIG. 1) through a network (e.g., the first network 198 or second network 199 of FIG. 1) using the communication module 190.

According to an embodiment, the sensor module 280 (e.g., the sensor module 176 of FIG. 1) may detect the light that has passed through the display member 201. According to an embodiment, the sensor module 280 may include a first sensor module 281 capable of detecting the light passed through the first display member 201a and a second sensor module 282 capable detecting the light passed through the second display member 201b. For example, the first sensor module 281 may detect light from behind the first display member 201a (e.g., +Y direction), and the second sensor module 282 may detect light from behind the second display member 201b. According to an embodiment, the sensor module 280 may include a third sensor module 283 capable of detecting light in front of the display member 201 (e.g., –Y direction). For example, the third sensor module 283 may detect light in front of the display member 201 (e.g., –Y direction). According to an embodiment, the sensor module 280 may be an illuminance sensor. According to an embodiment, the third sensor module 283 may have the same configuration in whole or part as the configuration of the second camera module 253.

Figure 5:
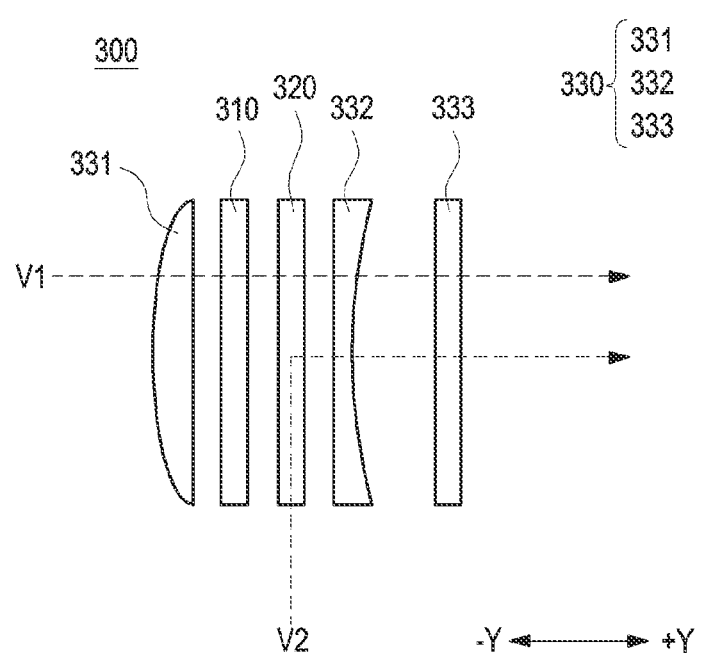
FIG. 5 is an exploded perspective view illustrating a display member according to an embodiment.

FIG. 5 is an exploded perspective view illustrating a display member according to an embodiment.

Referring to FIG. 5, a display member 300 may include a color-changeable lens 310, a waveguide 320, and a lens assembly 330. The configuration of the display member 300 of FIG. 5 may be identical in whole or part to the configuration of the display member 201 of FIGS. 2 to 4.

According to an embodiment, the transmittance of the color-changeable lens 310 may be changed. According to an embodiment, the color-changeable lens 310 may be an active dimming-type lens. For example, the color-changeable lens 310 may include at least one of a photo chromic lens, an electro chromic lens, a liquid crystal display (LCD) including a polarization layer or a guest-host liquid crystal display (GHLCD). According to an embodiment, the brightness of light in the actual environment transferred to the user may be adjusted based on the transmittance of the color-changeable lens 310. For example, the light V1 in the actual environment transferred to the display member 300 may be transferred to the user (e.g., eyes) through the color-changeable lens 310. According to an embodiment, the light (e.g., image) V2 output from the light output module 211 and passing through the waveguide 320 may not pass through the color-changeable lens 310. For example, the color-changeable lens 310 may be positioned in front of the waveguide 320 (e.g., −Y direction). According to an embodiment, the color-changeable lens may include a first color-changeable lens (not shown) positioned in the first display member (e.g., the first display member 201a of FIG. 2) and a second color-changeable lens (not shown) positioned in the second display member (e.g., the second display member 201b of FIG. 2).

According to an embodiment, the waveguide 320 may guide the light emitted from a light output module (e.g., the light output module 211 of FIG. 3). For example, the waveguide 320 may include at least one light splitter (not shown) for changing the propagation direction of light and may transfer the light emitted from the light output module 211 to the user. According to an embodiment, the waveguide may be formed of glass, plastic, or polymer. The waveguide may include a nano pattern formed on one surface of the inside or outside, e.g., a grating structure having a polygonal or curved shape. According to an embodiment, the waveguide may include at least one diffractive element, e.g., at least one of a diffractive optical element (DOE), a holographic optical element (HOE), or a reflective element (e.g., a reflective mirror). According to an embodiment, the diffractive element may include an input optical member (not shown) and/or an output optical member (not shown). The input optical member may refer, for example, to an input grating area. For example, the input grating area may be an inlet that diffracts or reflects light to transfer the light output from the light output module 211 to the display area (e.g., the display area 340 of FIG. 6). The output optical member is an output grating area, and may be an outlet for diffracting or reflecting the light transferred to the waveguide to the user's eyes. According to an embodiment, a portion of the display member 300 to which the light passed through the waveguide 320 is output may be interpreted as the display area 340. According to an embodiment, the waveguide 320 may include a first waveguide (not shown) positioned in the first display member (e.g., the first display member 201a of FIG. 2) and a second waveguide (not shown) positioned in the second display member (e.g., the second display member 201b of FIG. 2).

According to an embodiment, the lens structure 330 (e.g., the lens structure 270 of FIG. 4) may refract at least a portion of the light transferred to the display member 300. For example, the lens structure 330 may include a first lens 331 positioned in front of the color-changeable lens 310 (e.g., −Y direction) and/or a second lens 332 positioned behind the waveguide 320 (e.g., +Y direction). According to an embodiment, the first lens 331 may be a convex lens, and the second lens 332 may be a concave lens. According to an embodiment, the lens structure 330 may include a prescription lens 333 (e.g., the prescription lens 270 of FIG. 4) having a designated refractive power.

Figure 6:
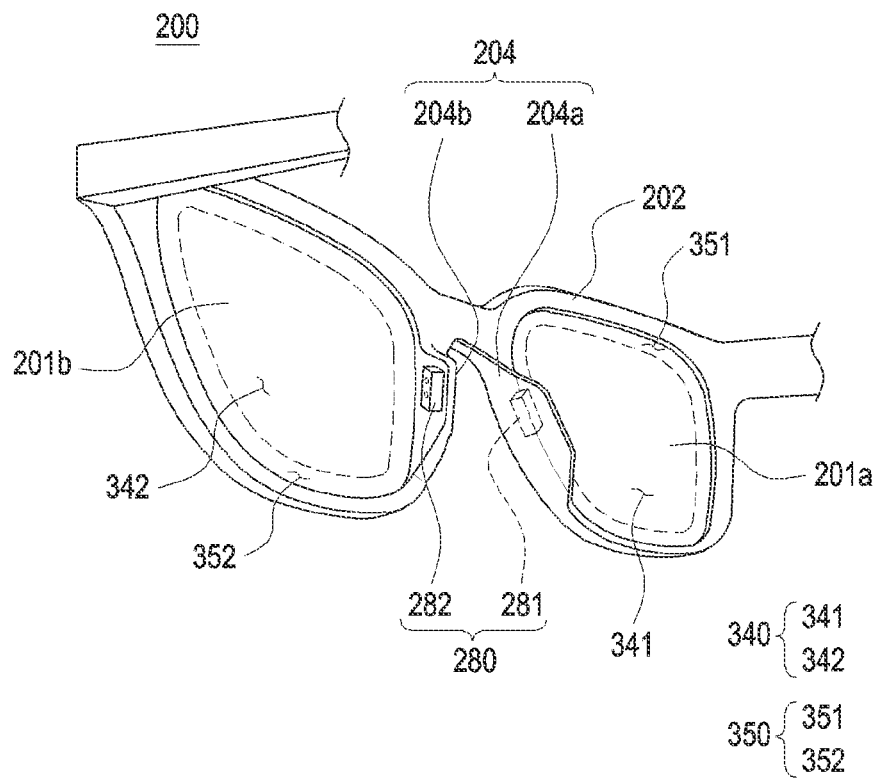
FIG. 6 is a perspective view illustrating an electronic device including a sensor module disposed on a seating area according to an embodiment.
Figure 7:
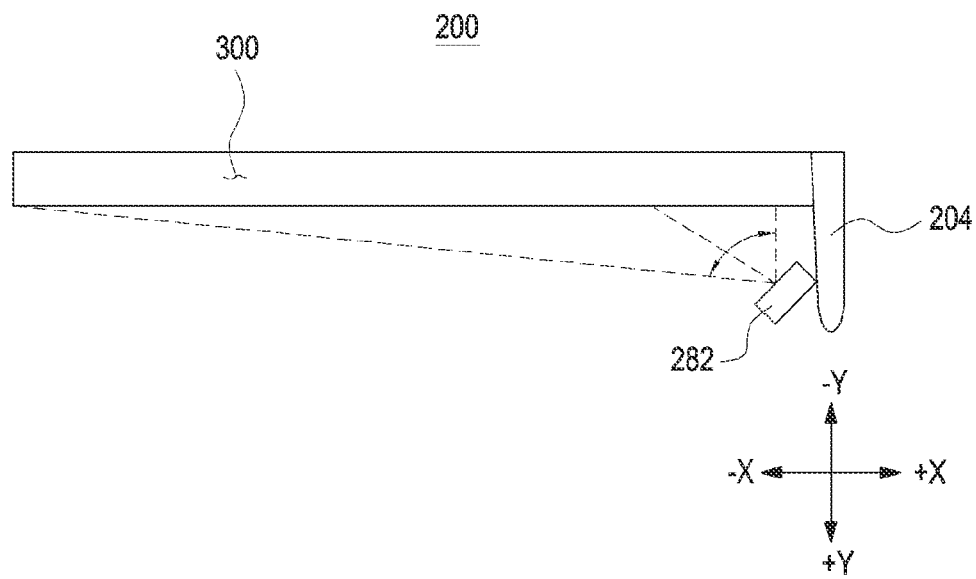
FIG. 7 is a diagram illustrating a detection area of a sensor module disposed on a seating area according to an embodiment.
Figure 8:
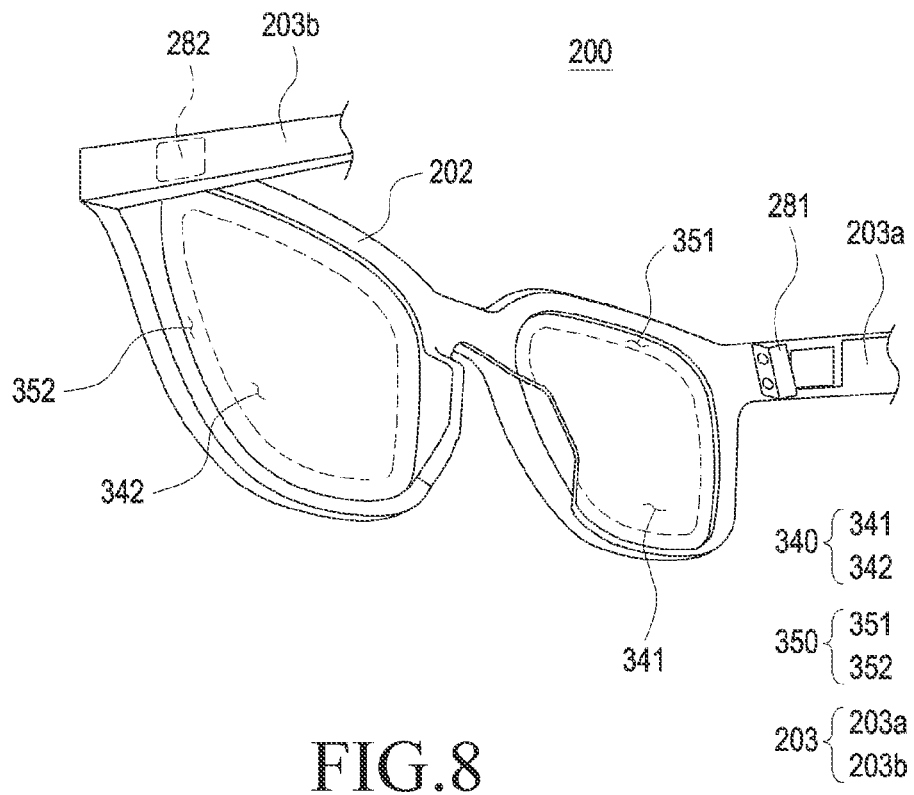
FIG. 8 is a perspective view illustrating an electronic device including a sensor module disposed on a wearing member according to an embodiment.
Figure 9:
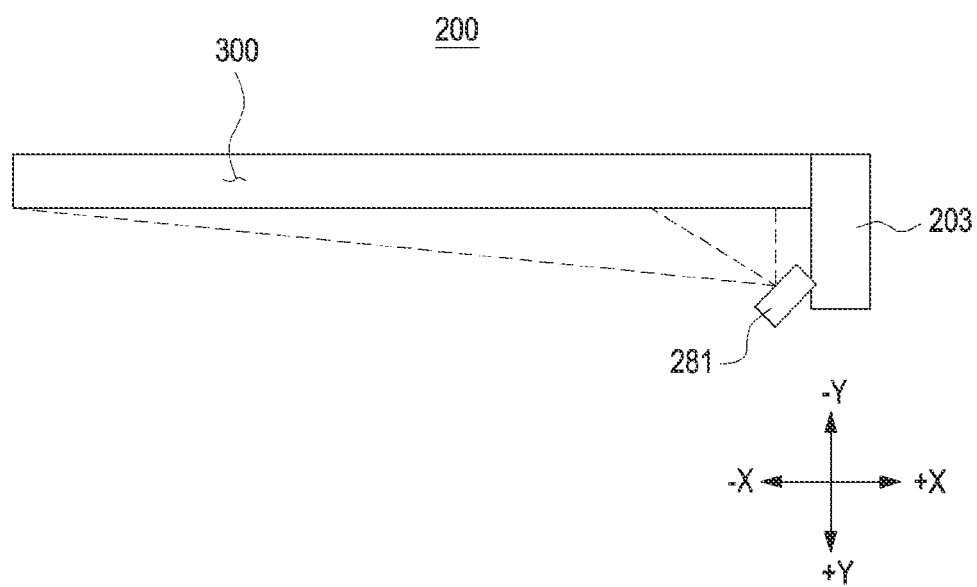
FIG. 9 is a diagram illustrating a sensor module for describing a detection area of a sensor module disposed on a wearing member according to an embodiment.

FIG. 6 is a perspective view illustrating an electronic device including a sensor module disposed on a seating area according to an embodiment. FIG. 7 is a diagram illustrating a detection area of a sensor module disposed on a seating area according to an embodiment. FIG. 8 is a perspective view illustrating an electronic device including a sensor module disposed on a wearing member according to an embodiment. FIG. 9 is a diagram illustrating a sensor module for describing a detection area of a sensor module disposed on a wearing member according to an embodiment.

Referring to FIGS. 6, 7, 8 and 9, an electronic device 200 may include a lens frame 202, a wearing member 203, a sensor module 280, and a display member 300. The configuration of the lens frame 202, the wearing member 203, the sensor module 280, and the display member 300 of FIGS. 6, 7, 8 and/or 9 may be identical in whole or part to the configuration of the lens frame 202, the wearing member 203, the sensor module 280, and the display member 201 of FIG. 3.

According to an embodiment, the lens frame 202 may include a seating area 204. According to an embodiment, the seating area 204 may face the user's body. For example, the seating area 204 may have a structure for supporting the electronic device (e.g., the electronic device 200 of FIG. 2) on the user's body (e.g., nose). According to an embodiment, the seating area 204 may be a nose pad. According to an embodiment, the seating area 204 may include a first seating area 204a to face a right portion of the user's nose and a second seating area 204b to face a left portion of the user's nose.

According to an embodiment, at least a portion of the sensor module 280 may be disposed in the lens frame 202. According to an embodiment (e.g., FIGS. 6 and 7), the sensor module 280 may be disposed on the seating area 204. For example, the first sensor module 281 may be disposed on the first seating area 204a. The second sensor module 282 may be disposed on the second seating area 204b. According to an embodiment (not shown), the first sensor module 281 and the second sensor module 282 may be positioned on a portion (e.g., a forehead support) of the lens frame 202 to face the user's body (e.g., forehead).

According to an embodiment (e.g., FIGS. 8 and 9), at least a portion of the sensor module 280 may be disposed on the wearing member 203. For example, the first sensor module 281 may be disposed on the first wearing member 203a, and that the second sensor module 282 may be disposed on the second wearing member 203b.

According to an embodiment, the display member 300 may include a display area 340 and a dummy area 350.

According to an embodiment, the display area 340 may transfer light emitted from a light output module (e.g., the light output module 211 of FIG. 3) to the user. For example, the display area 340 may be defined as an area where a waveguide (e.g., the waveguide 320 of FIG. 5) for refracting the light emitted from the light output module 211 is positioned. According to an embodiment, the user may view the image provided from the light output module 211 through the display area 340 while recognizing an external image through the display member 300. According to an embodiment, the display area 340 may include a first display area 341 positioned in the first display member (e.g., the first display member 201a of FIG. 2) and a second display area 342 positioned in the second display member (e.g., the second display member 201b of FIG. 2).

According to an embodiment, the dummy area 350 may be a portion of the display member 300 which does not transfer the light emitted from the light output module (e.g., the light output module 211 of FIG. 3) to the user. For example, the dummy area 350 may transfer the light V1 in the actual environment to the user. According to an embodiment, the dummy area 350 may surround at least a portion of the display area 340. According to an embodiment, the dummy area 350 may form at least a portion of the edge or periphery of the display member 201. According to an embodiment, the dummy area 350 may include a first dummy area 351 positioned in the first display member (e.g., the first display member 201a of FIG. 2) and a second dummy area 352 positioned in the second display member (e.g., the second display member 201b of FIG. 2).

According to an embodiment, the sensor module 280 may detect the illuminance of the light passed through the display member 300. According to an embodiment, the sensor module 280 may detect the light that has passed through the display area 340. According to an embodiment, the first sensor module 281 may detect light in the first display area 341, and the second sensor module 282 may detect light in the second display area 342. According to an embodiment, the sensor module 280 may detect the light that has passed through the dummy area 350. According to an embodiment, the first sensor module 281 may detect light in the first dummy area 351, and the second sensor module 282 may detect light in the second dummy area 352. For example, the sensor module 280 may have a field of view (FOV) for detecting the dummy areas 351 and 352. According to an embodiment (not shown), the first sensor module 281 may face at least a portion of the first dummy area 351, and the second sensor module 282 may face at least a portion of the second dummy area 352. For example, the first sensor module 281 may be disposed on the inner edge of the lens frame 202 to face the first dummy area 351, and the second sensor module 282 may be disposed on the inner edge of the lens frame 202 to face the second dummy area 352.

According to an embodiment, the processor (e.g., the processor 120 of FIG. 1) may determine the transmittance of the display member 300 using the sensor module 280. According to an embodiment, the processor 120 may determine the transmittance of the display member 300 based on the illuminance detected in the display area 340. According to an embodiment, the processor (e.g., the processor 120 of FIG. 1) may determine the transmittance of the display member 300 based on the scan rate (or refresh rate) of the image output from the display area 340. For example, the processor 120 may determine the transmittance of the display member 300 based on the illuminance of the display area 340 at the time when an image is not output from the display area 340. As another example, the processor 120 may determine the transmittance of the display member 300 based on the illuminance at the point where an image is not output in the display area 340. According to an embodiment, the processor 120 may determine the transmittance of the display member 300 based on the illuminance detected in the dummy area 350.

Figure 10:
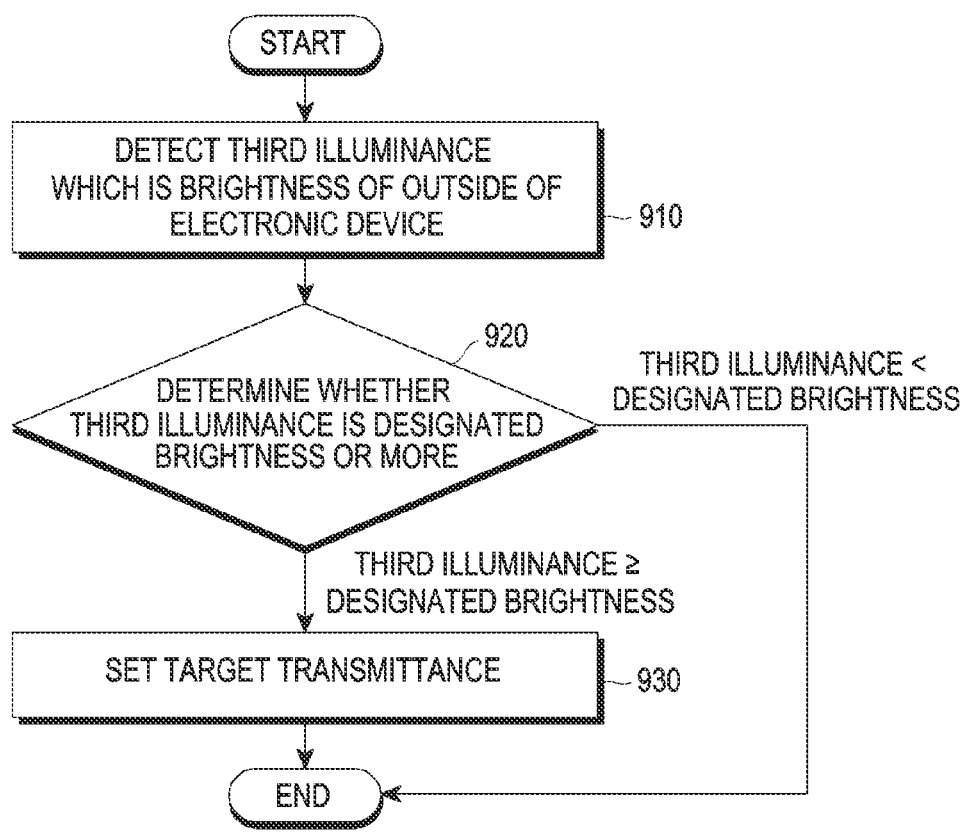
FIG. 10 is a flowchart illustrating example operations for setting a target transmittance of an electronic device according to an embodiment.

FIG. 10 is a flowchart illustrating example operations for setting a target transmittance of an electronic device according to an embodiment.

Referring to FIG. 10, the operation 900 of setting a target transmittance of an electronic device may include the operation 910 of detecting a third illuminance which is the brightness of the outside of the electronic device 200, the operation 920 of determining whether the third illuminance is a designated brightness or more, and the operation 930 of setting a target transmittance when the third illuminance is greater than or equal to the designated brightness. The configuration of the electronic device 200 of FIG. 10 may be identical in whole or part to the configuration of the electronic device 200 of FIGS. 2, 3 and 4.

According to an embodiment, the electronic device 200 may detect the third illuminance which is the brightness of the outside of the electronic device 200, using a third sensor module (e.g., the third sensor module 283 of FIG. 3) and/or a second sensor module (e.g., the second sensor module 253 of FIG. 3).

According to an embodiment, the processor (e.g., the processor 120 of FIG. 1) of the electronic device 200 may determine whether the third illuminance is a designated brightness or less (e.g., lux). According to an embodiment, the processor 120 may determine whether to change the transmittance of the display member (e.g., the display member 300 of FIG. 5) based on the third illuminance. According to an embodiment, the designated brightness is a brightness for visibility of the image output from the light output module (e.g., the light output module 211 of FIG. 3) and may be data and/or information stored in the memory (e.g., the memory 130 of FIG. 1). According to an embodiment, when the third illuminance is equal to or larger than the designated brightness, the processor 120 may reduce the transmittance of the display member 300, increasing the visibility of the image output from the light output module (e.g., the light output module 211 of FIG. 3). According to an embodiment, when the third illuminance is less than the designated brightness, the processor 120 may not adjust the transmittance of the display member 300.

According to an embodiment, the processor (e.g., the processor 120 of FIG. 1) may set the target transmittance of the display member (e.g., the display member 300 of FIG. 5) based on the third illuminance. For example, the processor 120 may set the target transmittance of the display member 300 so that the brightness of the light passed through the display member 300 is changed to be less than the designated brightness.

Figure 11:
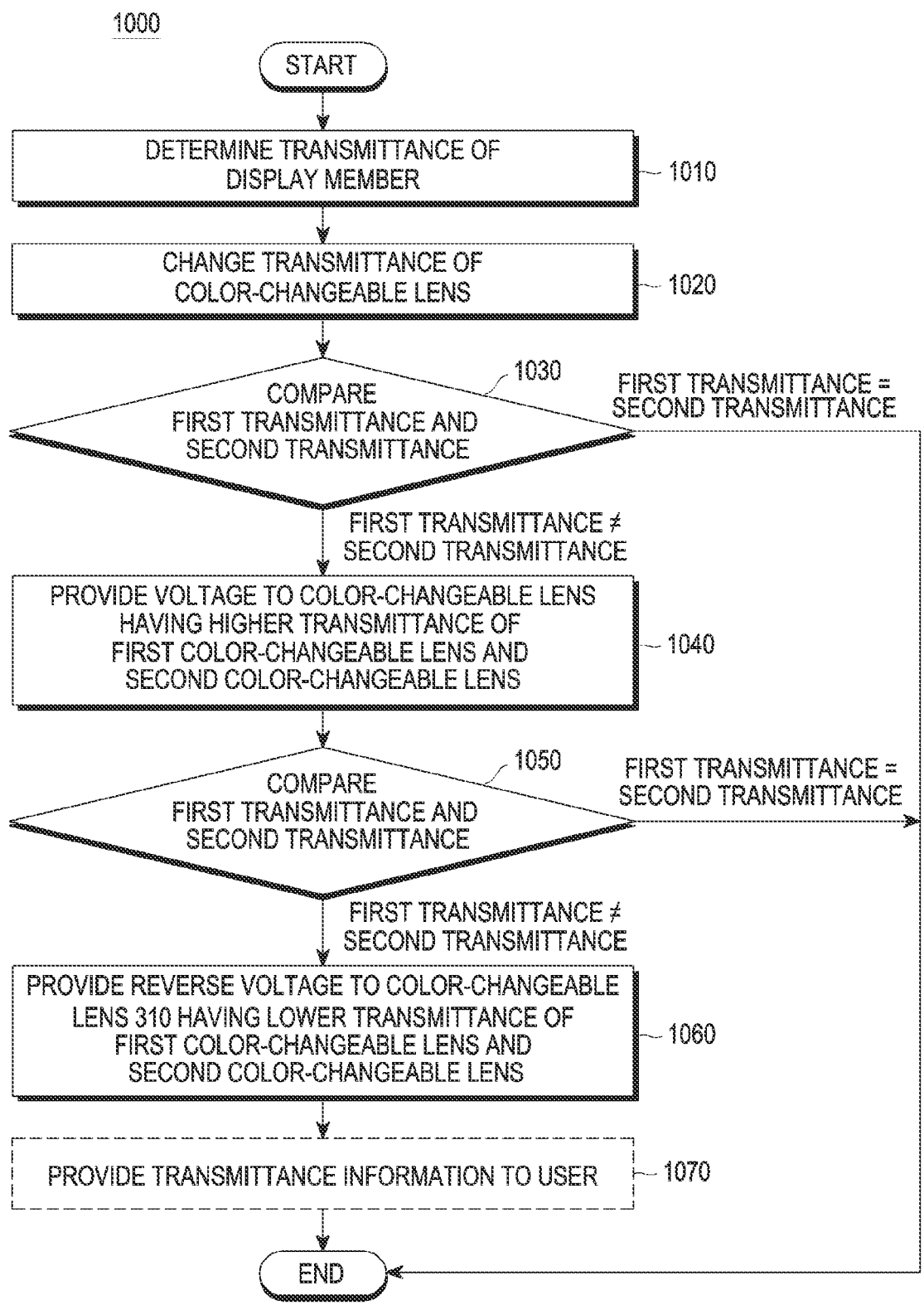
FIG. 11 is a flowchart illustrating an example operation for changing the transmittance of an electronic device according to an embodiment.
Figure 12:
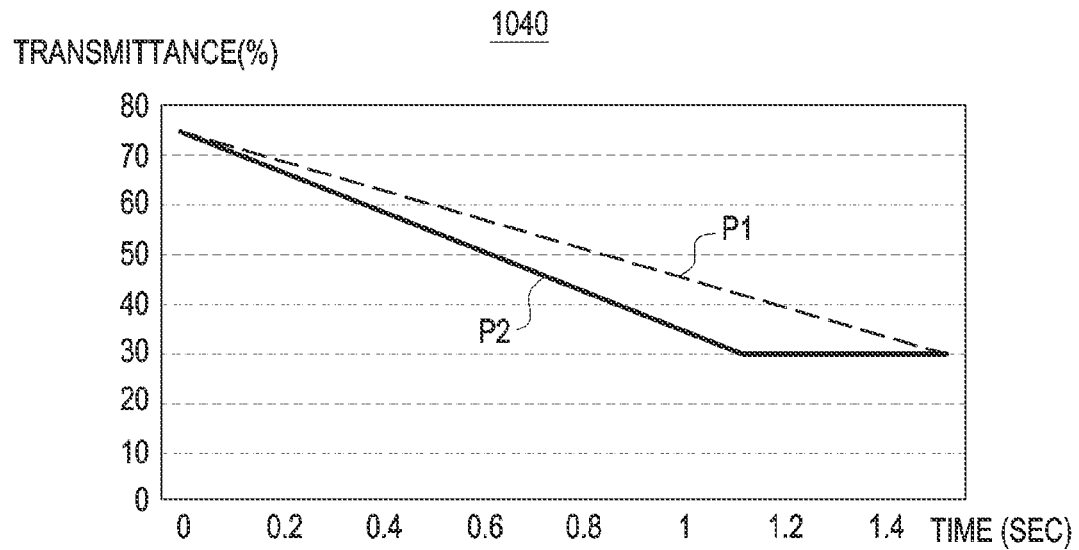
FIG. 12 is a graph illustrating an operation of FIG. 11 according to an embodiment.
Figure 13:
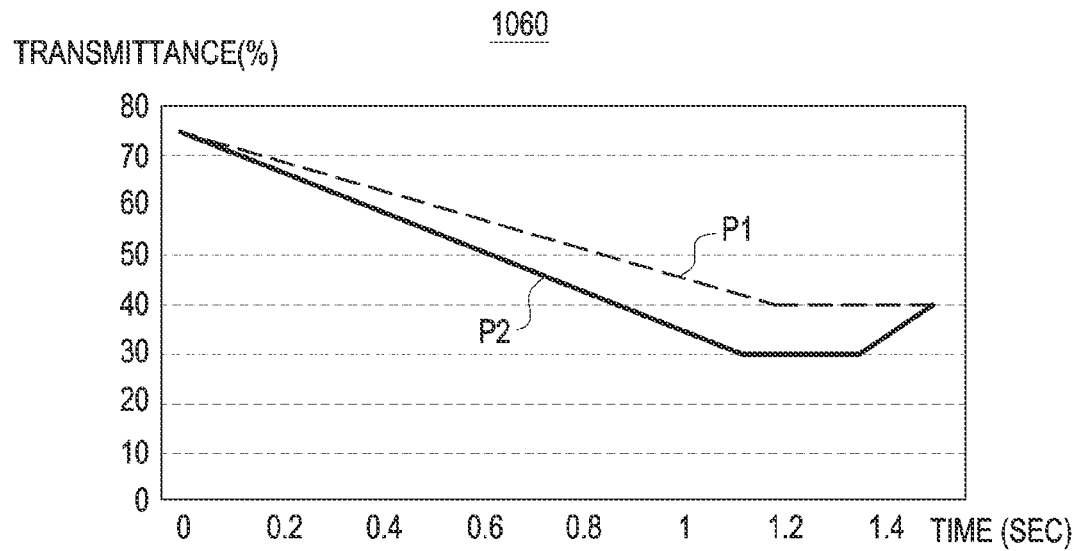
FIG. 13 is a graph illustrating an operation of FIG. 11 according to an embodiment.

FIG. 11 is a flowchart illustrating an example operation for changing the transmittance of an electronic device according to an embodiment. FIG. 12 is a graph illustrating operation 1040 of FIG. 11. FIG. 13 is a graph illustrating operation 1060 of FIG. 11.

Referring to FIGS. 11, 12 and 13, the operation 1000 of changing the transmittance of the electronic device may include the operation 1010 of determining the transmittance of the color-changeable lens, the operation 1020 of changing the transmittance of the color-changeable lens, the operation 1030 of comparing a first transmittance and a second transmittance, the operation 1040 of providing a voltage to the color-changeable lens 310 having a higher transmittance of a first color-changeable lens and a second color-changeable lens when the first transmittance is not equal to the second transmittance, the operation 1050 of comparing the first transmittance and the second transmittance, the operation 1060 of providing a reverse voltage to the color-changeable lens 310 having a lower transmittance of the first color-changeable lens and the second color-changeable lens when the first transmittance is not equal to the second transmittance, and/or the operation 1070 of notifying the user of the transmittance. The configuration of the display member 300 and the color-changeable lens 310 of FIGS. 11, 12, and/or 13 may be identical in whole or part to the configuration of the display member 300 and the color-changeable lens 310 of FIG. 5.

According to an embodiment, the processor 120 may perform the operation 1010 of determining the transmittance of the display member (e.g., the display member 300 of FIG. 5) and/or the color-changeable lens 310. For example, the processor 120 may determine the first transmittance of the first display member 201*a* based on a difference between the third transmittance which is the brightness of the outside of the electronic device 200 and the first transmittance of the light passed through the first display member (e.g., the first display member 201*a* of FIG. 3) and determine the second transmittance of the second display member 201*b* based on a difference between the third transmittance and the second transmittance of the light passed through the second display member (e.g., the second display member 201*b* of FIG. 3). The third transmittance may be interpreted as the transmittance of the light transferred to the display member 300.

According to an embodiment, the processor (e.g., the processor 120 of FIG. 1) may perform the operation 1020 of changing the transmittance of the color-changeable lens 310. For example, the processor 120 may provide a voltage to the color-changeable lens 310 to reduce the transmittance of the color-changeable lens or may provide a reverse voltage to the color-changeable lens 310 to increase the transmittance of the color-changeable lens 310. According to an embodiment, the processor 120 may adjust the first transmittance of the first color-changeable lens and/or the second transmittance of the second color-changeable lens based on the first illuminance detected using the first sensor module (e.g., the first sensor module 281), the second illuminance detected using the second sensor module (e.g., the second sensor module 282 of FIG. 3), and/or the third illuminance detected using the third sensor module (e.g., the third sensor module of FIG. 3).

According to an embodiment, the processor (e.g., the processor 120 of FIG. 1) may perform the operation 1030 of comparing the first transmittance and the second transmittance. For example, the processor 120 may compare the first transmittance and the second transmittance after operation 1020 is performed. According to an embodiment, when the first transmittance and the second transmittance are substantially identical to each other, the processor 120 may stop changing the transmittance of the color-changeable lens 310.

According to an embodiment, the processor (e.g., the processor 120 of FIG. 1) may change the transmittance of the color-changeable lens 310 when the first transmittance differs from the second transmittance. According to an embodiment, when the second illuminance differs from the second illuminance, the processor 120 may provide a voltage to at least one of the first color-changeable lens or the second color-changeable lens so that the first transmittance is substantially identical to the second transmittance. For example, when the first transmittance differs from the second transmittance, the processor 120 may perform the operation 1040 of providing a voltage to the color-changeable lens having a higher transmittance of the first color-changeable lens and the second color-changeable lens. According to an embodiment, the processor 120 may be configured to provide a voltage to the first color-changeable lens when the first transmittance is lower than a designated transmittance and provide a voltage to the second color-changeable lens when the second transmittance is lower than the designated transmittance. The first transmittance may be interpreted as the transmittance of the first display member (e.g., the first display member 201*a* of FIG. 3) including the first color-changeable lens, and the second transmittance may be interpreted as the transmittance of the second display member (e.g., the second display member 201*b* of FIG. 3) including the second color-changeable lens. According to an embodiment, the color-changeable lens 310 may have the transmittance reduced when receiving a voltage and the transmittance increased when receiving a reverse voltage. According to an embodiment (e.g., FIG. 12), the first transmittance P1 of the first color-changeable lens may be higher than the second transmittance P2 of the second color-changeable lens during a predetermined time (e.g., 0 to 1 second) after the voltage is applied to the color-changeable lens 310. When only some of the color-changeable lenses 310 reach a target transmittance (e.g., the designated transmittance), the processor 120 may provide a voltage to the color-changeable lens (e.g., the first color-changeable lens) which does not reach the target transmittance and may not provide a voltage to the color-changeable lens (e.g., the second color-changeable lens) which does not reach the target transmittance. As the first transmittance P1 of the first color-changeable lens is reduced by voltage, the first transmittance P1 of the first color-changeable lens and the second transmittance P2 of the second color-changeable lens may be adjusted to be substantially the same. According to an embodiment, the processor 120 may adjust the designated transmittance based on the brightness (illuminance) of the outside of the electronic device (e.g., the electronic device 200 of FIG. 3). For example, the processor 120 may determine the brightness of the outside of the electronic device 200 using a sensor module (e.g., the third sensor module 283 of FIG. 3) and/or an illuminance sensor (not shown) and may determine a designated transmittance based on the determined external brightness.

According to an embodiment, the processor (e.g., the processor 120 of FIG. 1) may perform the operation 1050 of comparing the first transmittance and the second transmittance. For example, the processor 120 may compare the first transmittance and the second transmittance after operation 1040 is performed. According to an embodiment, when the first transmittance and the second transmittance are substantially equal to each other, the processor 120 may stop the transfer of the voltage provided to the first color-changeable lens or the second color-changeable lens.

According to an embodiment, the processor (e.g., the processor 120 of FIG. 1) may change the transmittance of the color-changeable lens 310 when the first transmittance differs from the second transmittance. For example, when the first transmittance differs from the second transmittance, the processor 120 may perform the operation 1060 of providing a voltage to the color-changeable lens having a lower transmittance of the first color-changeable lens and the second color-changeable lens.

According to an embodiment (e.g., FIG. 13), the first transmittance P1 of some (e.g., the first color-changeable lens) of the color-changeable lenses 310 may not reach the target transmittance. For example, due to a defect in the first color-changeable lens, the first color-changeable lens may fail to reach the target transmittance while the second color-changeable lens reaches the target transmittance. The processor 120 may provide a reverse voltage to the color-changeable lens that has reached the target transmittance. As the second transmittance P2 of the second color-changeable lens is increased by reverse voltage, the first transmittance P1 of the first color-changeable lens and the second transmittance P2 of the second color-changeable lens may be adjusted to be substantially the same.

According to an embodiment, the processor (e.g., the processor 120 of FIG. 1) may performs the operation 1070 of providing transmittance information to the user. For example, the processor 120 may provide the user with information indicating that the transmittance of the display member 300 is lower than the target transmittance, using a display (e.g., the display module 160 of FIG. 1), an audio module (e.g., the audio module 170 of FIG. 1), and/or a haptic module (e.g., the haptic module 179 of FIG. 1). For example, the processor 120 may provide the user with information indicating that repair and/or replacement of the color-changeable lens 310 is required.

According to an embodiment of the disclosure, an electronic device (e.g., the electronic device 200 of FIG. 2) may comprise: a housing (e.g., the housing 210 of FIG. 2), a light output module including light output circuitry (e.g., the light output module 211 of FIG. 3) disposed in the housing and configured to output an image, a display member (e.g., the display member 201 of FIG. 2) including a display and a first display member (e.g., the first display member 201a of FIG. 3) including a first color-changeable lens (e.g., the color-changeable lens 310 of FIG. 5) and a first waveguide (e.g., the waveguide 320 of FIG. 5) disposed behind (e.g., the +Y direction of FIG. 3) the first color-changeable lens configured to guide light generated from the light output module and a second display member (e.g., the second display member 201b of FIG. 3) including a second color-changeable lens (e.g., the color-changeable lens 310 of FIG. 5) and a second waveguide (e.g., the waveguide 320 of FIG. 5) disposed behind the second color-changeable lens configured to guide the light generated from the light output module, a sensor module (e.g., the sensor module 280 of FIG. 3) including at least one sensor a first sensor module (e.g., the first sensor module 281 of FIG. 3) including a first sensor configured to detect a first illuminance of light passed through the first display member, a second sensor module (e.g., the second sensor module 282 of FIG. 3) including a second sensor configured to detect a second illuminance of light passed through the second display member, and a third sensor module (e.g., the third sensor module 283 of FIG. 3) including a third sensor configured to detect a third illuminance of light transferred to the display member, and a processor (e.g., the processor 120 of FIG. 1) configured to adjust a first transmittance of the first color-changeable lens and a second transmittance of the second color-changeable lens based on the first illuminance, the second illuminance, or the third illuminance, wherein the processor is configured to, based on the first illuminance differing from the second illuminance, provide a voltage to at least one of the first color-changeable lens or the second color-changeable lens so that the first transmittance and the second transmittance are substantially equal to each other.

According to an embodiment, the processor may provide the voltage to the first color-changeable lens based on the first transmittance being less than a designated transmittance. The processor may provide the voltage to the second color-changeable lens based on the second transmittance being less than the designated transmittance.

According to an embodiment, the housing may include a lens frame (e.g., the lens frame 202 of FIG. 2) receiving the display member and at least one wearing piece (e.g., the wearing member 230 of FIG. 2) connected to the lens frame.

According to an embodiment, the lens frame may include a seating area (e.g., the seating area 204 of FIG. 6) arranged to face a user's body. The first sensor module and the second sensor module may be disposed on the seating area.

According to an embodiment, the first sensor module and the second sensor module may be disposed on the at least one wearing piece.

According to an embodiment, the first display member may include a first display area (e.g., the first display area 341 of FIG. 6) configured to output light passed through the first waveguide and a first dummy area (e.g., the first dummy area 351 of FIG. 6) surrounding at least a portion of the first display area. The second display member may include a second display area (e.g., the second display area 342 of FIG. 6) configured to output light passed through the second waveguide and a second dummy area (e.g., the second dummy area 352 of FIG. 6) surrounding at least a portion of the second display area.

According to an embodiment, the first sensor module may be configured to detect light passed through the first display area. The second sensor module may be configured to detect light passed through the second display area. The processor may be configured to determine the first illuminance and the second illuminance considering a scan rate of the light output module.

According to an embodiment, the first sensor module may face at least a portion of the first dummy area, and the second sensor module may face at least a portion of the second dummy area.

According to an embodiment, the first sensor module may be configured to detect the first illuminance in the first dummy area, and the second sensor module may be configured to detect the second illuminance in the second dummy area.

According to an embodiment, the color-changeable lens may include a photo chromic lens, an electro chromic lens, a liquid crystal including a polarization layer, or a guest-host liquid crystal.

According to an embodiment, the processor may be configured to: adjust a transmittance of the first color-changeable lens based on a difference between the first illuminance and the third illuminance and adjust a transmittance of the second color-changeable lens based on a difference between the second illuminance and the third illuminance.

According to an embodiment, the display member may include a convex first lens disposed in front of the color-changeable lens and a concave second lens disposed behind the waveguide.

According to an embodiment, the sensor module may include an illuminance sensor.

According to an embodiment, the electronic device may further comprise: at least one first camera module (e.g., the first camera module 251 of FIG. 3) including a camera configured to detect a trajectory of a user's gaze, a second camera module (e.g., the second camera module 253 of FIG. 3) including a camera configured to capture an external image, and at least one third camera module (e.g., the third camera module 255 of FIG. 3) including a camera configured to capture the user's motion.

According to an embodiment, an electronic device (e.g., the electronic device 200 of FIG. 2) may comprise: a housing (e.g., the housing 210 of FIG. 2), a light output module (e.g., the light output module 211 of FIG. 3) comprising light output circuitry disposed in the housing and configured to output an image, a first display member (e.g., the first display member 201a of FIG. 3) comprising a display including a first color-changeable lens (e.g., the color-changeable lens 310 of FIG. 5) and a first waveguide (e.g., the waveguide 320 of FIG. 5) disposed behind the first color-changeable lens configured to guide light generated from the light output module, a second display member (e.g., the second display member 201b of FIG. 3) including a second color-changeable lens (e.g., the color-changeable lens 310 of FIG. 5) and a second waveguide (e.g., the waveguide 320 of FIG. 5) disposed behind the second color-changeable lens configured to guide light generated from the light output module, a first sensor module (e.g., the first sensor module 281 of FIG. 3) including a first sensor configured to detect a first illuminance of light passed through the first display member, a second sensor module (e.g., the second sensor module 282 of FIG. 3) including a second sensor configured to detect a second illuminance of light passed through the second display member, and a processor (e.g., the processor 120 of FIG. 1) configured to: adjust at least one of a first transmittance of the first color-changeable lens or a second transmittance of the second color-changeable lens based on a difference between the first illuminance and the second illuminance.

According to an embodiment, the electronic device may further comprise: a third sensor module (e.g., the third sensor module 283 of FIG. 3) including a third sensor configured to detect a third illuminance of light transferred to the first display member or the second display member. The processor may be configured to: determine the first transmittance based on the first illuminance, determine the second transmittance based on the second illuminance, and determine a designated transmittance based on the third illuminance. The processor may be configured to provide a voltage to at least one of the first color-changeable lens or the second color-changeable lens so that the first transmittance and the second transmittance are substantially equal to each other.

According to an embodiment, the processor may be configured to provide a reverse voltage to a lens having a higher transmittance of the first color-changeable lens or the second color-changeable lens based on the first color-changeable lens or the second color-changeable lens failing to reach the designated transmittance.

According to an embodiment, the housing may include: a lens frame (e.g., the lens frame 202 of FIG. 3) receiving the display member and at least one wearing piece (e.g., the wearing member 203 of FIG. 3) connected to the lens frame.

According to an embodiment, the lens frame may include a seating area (e.g., the seating area 204 of FIG. 6) facing a user's body. The first sensor module and the second sensor module may be disposed on the seating area.

It is apparent to one of ordinary skill in the art that an electronic device including a sensor module as described above are not limited to the above-described embodiments and those shown in the drawings, and various changes, modifications, or alterations may be made thereto without departing from the scope of the present disclosure. In other words, while the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a housing;
   a light output module comprising light output circuitry disposed in the housing and configured to output an image;
   a display member comprising a display including a first display member including a first color-changeable lens and a first waveguide disposed behind the first color-changeable lens configured to guide light generated from the light output module and a second display member including a second color-changeable lens and a second waveguide disposed behind the second color-changeable lens configured to guide the light generated from the light output module;
   a sensor module comprising at least one sensor including a first sensor module including a first sensor configured to detect a first illuminance of light passed through the first display member, a second sensor module including a second sensor configured to detect a second illuminance of light passed through the second display member, and a third sensor module including a third sensor configured to detect a third illuminance of light transferred to the display member; and
   a processor configured to adjust a first transmittance of the first color-changeable lens and a second transmittance of the second color-changeable lens based on the first illuminance, the second illuminance, or the third illuminance,
   wherein the processor is configured to, based on the first illuminance differing from the second illuminance, provide a voltage to at least one of the first color-changeable lens or the second color-changeable lens so that the first transmittance and the second transmittance are substantially equal to each other.

2. The electronic device of claim 1, wherein the processor is configured to: provide the voltage to the first color-changeable lens based on the first transmittance being less than a designated transmittance and provide the voltage to the second color-changeable lens based on the second transmittance being less than the designated transmittance.

3. The electronic device of claim 2, wherein the processor is configured to provide a reverse voltage to a lens having a higher transmittance of the first color-changeable lens or the second color-changeable lens based on the first color-changeable lens or the second color-changeable lens failing to reach the designated transmittance.

4. The electronic device of claim 1, wherein the housing includes a lens frame receiving the display member and at least one wearing piece connected to the lens frame.

5. The electronic device of claim 4, wherein the lens frame includes a seating area arranged to face a user's body, and
   wherein the first sensor module and the second sensor module are disposed on the seating area.

6. The electronic device of claim 4, wherein the first sensor module and the second sensor module are disposed on the at least one wearing piece.

7. The electronic device of claim 1, wherein the first display member includes a first display area configured to output light passed through the first waveguide and a first dummy area surrounding at least a portion of the first display area, and
   wherein the second display member includes a second display area configured to output light passed through the second waveguide and a second dummy area surrounding at least a portion of the second display area.

8. The electronic device of claim 7, wherein the first sensor module is configured to detect light passed through the first display area,
   wherein the second sensor module is configured to detect light passed through the second display area, and
   wherein the processor is configured to determine the first illuminance and the second illuminance considering a refresh rate of the light output module.

9. The electronic device of claim 7, wherein the first sensor module faces at least a portion of the first dummy area, and the second sensor module faces at least a portion of the second dummy area.

10. The electronic device of claim 7, wherein the first sensor module is configured to detect the first illuminance in the first dummy area, and the second sensor module is configured to detect the second illuminance in the second dummy area.

11. The electronic device of claim 1, wherein the color-changeable lens includes a photo chromic lens, an electro chromic lens, a liquid crystal including a polarization layer, or a guest-host liquid crystal.

12. The electronic device of claim 1, wherein the processor is configured to: adjust a transmittance of the first color-changeable lens based on a difference between the first illuminance and the third illuminance and adjust a transmittance of the second color-changeable lens based on a difference between the second illuminance and the third illuminance.

13. The electronic device of claim 1, wherein the display member includes a convex first lens disposed in front of the color-changeable lens and a concave second lens disposed behind the waveguide.

14. The electronic device of claim 1, wherein the sensor module includes an illuminance sensor.

15. The electronic device of claim 1, further comprising:
at least one first camera module including a camera configured to detect a trajectory of a user's gaze;
a second camera module including a camera configured to capture an external image; and
at least one third camera module including a camera configured to capture the user's motion.

16. An electronic device comprising:
a housing;
a light output module comprising light output circuitry disposed in the housing and configured to output an image;
a first display member comprising a display including a first color-changeable lens and a first waveguide disposed behind the first color-changeable lens configured to guide light generated from the light output module;
a second display member including a second color-changeable lens and a second waveguide disposed behind the second color-changeable lens configured to guide light generated from the light output module;
a first sensor module including a first sensor configured to detect a first illuminance of light passed through the first display member;
a second sensor module including a second sensor configured to detect a second illuminance of light passed through the second display member; and
a processor configured to adjust at least one of a first transmittance of the first color-changeable lens or a second transmittance of the second color-changeable lens based on a difference between the first illuminance and the second illuminance.

17. The electronic device of claim 16, further comprising a third sensor module including a third sensor configured to detect a third illuminance of light transferred to the first display member or the second display member,
wherein the processor is configured to: determine the first transmittance based on the first illuminance, determine the second transmittance based on the second illuminance, and determine a designated transmittance based on the third illuminance, and
wherein the processor is configured to provide a voltage to at least one of the first color-changeable lens or the second color-changeable lens so that the first transmittance and the second transmittance are substantially equal to each other.

18. The electronic device of claim 16, further comprising a third sensor module including a third sensor configured to detect a third illuminance of light transferred to the first display member or the second display member,
wherein the processor is configured to: determine the first transmittance based on the first illuminance, determine the second transmittance based on the second illuminance, and determine a designated transmittance based on the third illuminance, and
wherein the processor is configured to provide a voltage to at least one of the first color-changeable lens or the second color-changeable lens so that the first transmittance and the second transmittance are substantially equal to each other.

19. The electronic device of claim 16, wherein the housing includes a lens frame receiving the display member and at least one wearing piece connected to the lens frame.

20. The electronic device of claim 19, wherein the lens frame includes a seating area arranged to face a user's body, and
wherein the first sensor module and the second sensor module are disposed on the seating area.

* * * * *